UNITED STATES PATENT OFFICE.

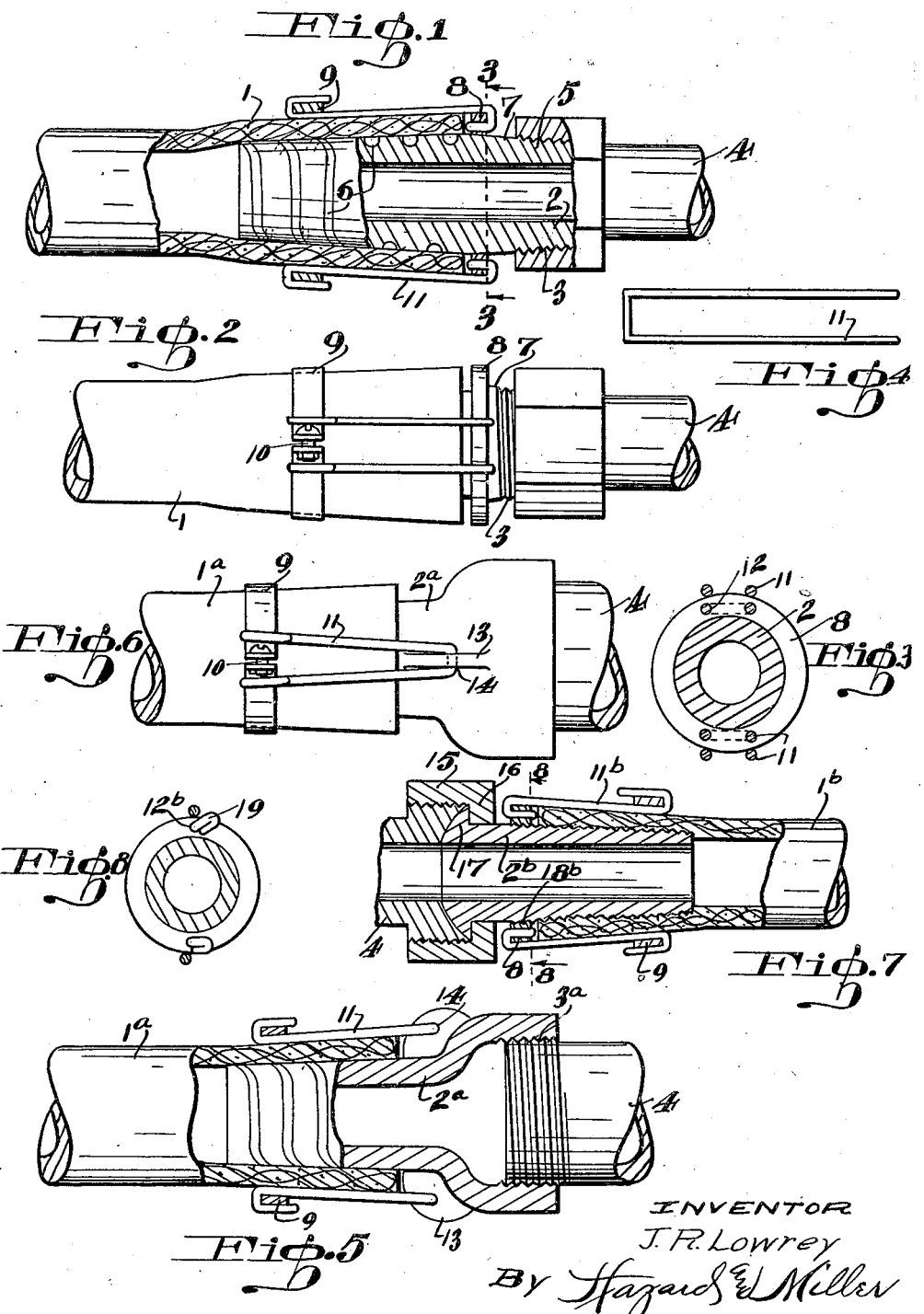

JOHN R. LOWREY, OF SAN PEDRO, CALIFORNIA.

HOSE CLAMP.

1,426,086. Specification of Letters Patent. Patented Aug. 15, 1922.

Application filed March 15, 1920. Serial No. 365,929.

*To all whom it may concern:*

Be it known that I, JOHN R. LOWREY, a citizen of the United States, residing at San Pedro, in the county of Los Angeles and State of California, have invented new and useful Improvements in Hose Clamps, of which the following is a specification.

This invention relates to improvements in hose clamps, and has for its object to provide novel means for clamping a rubber hose or the like to any desired connecting medium such as a metallic nipple.

It is an object of this invention to provide a clamp for this purpose wherein a positive tie is provided between the hose and the connecting medium, thereby producing an efficient clamping action and preventing the possibility of the parts working apart.

It is a further object of the invention to provide a clamp which will be of simple and durable construction, and which will be relatively inexpensive to manufacture.

Further objects of the invention will become apparent from the following description of the accompanying drawings in which:

Figure 1 is a longitudinal section through a hose and a connecting medium to which it is secured, my improved clamp being employed thereon.

Figure 2 is a side elevation of the same.

Figure 3 is a transverse section taken on the line 3—3 of Fig. 1.

Figure 4 is a detail view of one of the tying wires employed in my improved clamp.

Figure 5 is a view similar to Fig. 1 of a modified form of my invention.

Figure 6 is a view similar to Fig. 2 of this modification.

Figure 7 is a view similar to Fig. 1 of a still further modification of my invention.

Figure 8 is a transverse section taken on the line 8—8 of Fig. 7.

Referring to the form of my invention illustrated in Figs. 1 to 4, the end of a section of hose is shown at 1 received over the end of a metallic nipple 2. This nipple may be any well-known or preferred connecting medium to which a nozzle, faucet or the like may be attached in any well-known manner. For the purpose of illustration I have shown the nipple as provided with an external screw thread 3 arranged for threaded engagement with the end of a pipe 4 provided with an internal screw thread 5.

The end of the nipple over which the hose 1 is received is preferably tapered so that a wedging engagement is provided when the end of the hose is forced on to the end of the nipple. This tapered surface of the nipple is also preferably spirally grooved as shown at 6 to increase the gripping action of the hose upon the nipple. The end of the nipple 2 which projects beyond the end of the hose 1 is tapered away from the hose and toward its threaded end 3 as shown at 7. An annular collar 8 is received over this tapered end of the nipple and is arranged to be firmly wedged upon the nipple in close proximity to the end of the hose 1.

A tying medium is provided between the collar 8 wedged upon the nipple 2 and the hose 1 received over the end of the nipple. For this purpose a clamping band 9 is received about the hose 1, the ends of the band being drawn together in any well-known manner as by a bolt 10 for clamping the hose to the nipple. The tying medium employed between collar 8 and clamping band 9 may consist of wires 11 preferably arranged at diametrically opposite points of the coupling. Each of these wires are shown as U-shaped with its arms extending through adjacent apertures 12 provided in collar 8, and the base of the U formed by the wire engaging against the collar 8. The arms of wire 11 are bent back over collar 8 and along the end of hose 1 and extend beneath clamping band 9, the ends of said arms of the wire being bent back over the clamping band 9. The base of the U formed by the tying wire is thus positively secured to collar 8 which is in turn firmly wedged upon the nipple 2, and the ends of the tying wire are firmly secured to the hose 1 by the clamping band. A positive tie is thus provided between the nipple and the hose which is wedged over the tapered end of the nipple.

In the modification illustrated in the Figs. 5 and 6 the hose 1ª is received over the tapered end of a nipple 2ª the outwardly projecting end of which consists of an internally threaded cup 3ª adapted for threaded engagement with a pipe 4.

Instead of the collar 8 wedged upon the nipple, diametrically disposed longitudinally extending lugs 13 are provided upon nipple 2ª adjacent the end of the hose received over said nipple. These lugs are each provided with a transverse aperture 14 through which is received a tie wire 11, the ends of said tie wire being received beneath and bent back upon a clamping band 9 clamped upon the hose 1ª in the manner previously described.

In the further modification of my invention as illustrated in Figs. 7 and 8, the hose 1ᵇ is received over a nipple 2ᵇ which forms a coupling with a pipe 4. This coupling may consist of a collar 15 threaded to the end of pipe 4 and provided with an inwardly extending annular shoulder 16 arranged to engage beneath the shoulder formed by an enlarged head 17 provided upon the end of nipple 2ᵇ. In this construction a collar 8ᵇ similar to the collar 8 previously described, is received about the nipple 2ᵇ adjacent the end of the hose 1ᵇ. This collar is preferably secured upon the nipple by a threaded engagement 18, the end of the nipple received within the hose being preferably threaded throughout its length so that the collar may be threaded thereon and properly positioned before the hose is forced over the end of the nipple. A clamping band 9 is provided upon the hose and the ends of tying wires secured to the collar 8ᵇ are preferably clamped beneath and bent back upon this clamping band. Instead of the U-shaped tying wires previously described however, straight wires 11ᵇ are preferably employed. For this purpose the collar 8ᵇ is provided with single apertures 12ᵇ at diametrically opposite points and the wires 11ᵇ are provided with knotted ends, the wires being threaded through the apertures until their knotted ends engage collar 8ᵇ, and are then bent back over the collar 8ᵇ and clamped beneath the clamping band 9 as previously described.

It will be apparent that various changes in the construction, combination, and arrangements of parts herein described may be resorted to without departing from the spirit and scope of my invention, and I do not wish to limit myself to the exact disclosure herein.

What I claim is:

1. In a hose clamp, a hose, a nipple received within said hose, the projecting end of said nipple being tapered away from said hose, a collar having a wedging engagement upon said tapered end of said nipple, a tie wire threaded through apertures formed in said collar, and a clamping band for clamping said hose to said nipple, and the ends of which tie wire are formed into hooks which engage said clamping band.

2. The combination with a hose, of a nipple having a body portion that tapers gradually toward one end, said tapered body portion being positioned in the end of the hose, a perforated member on said nipple beyond the end of the hose, a clamping ring encircling that portion of the hose that is positioned on the tapered body portion of the nipple, and a tie wire threaded through the perforated member and having its ends formed into hooks which engage said clamping ring.

3. A hose clamp comprising a nipple the external surface of which tapers from an intermediate point toward its ends, one of the tapered portions being longer than the other and adapted to be positioned in the end of a hose, a perforated ring removably positioned on the tapered portion of the nipple that projects beyond the end of the hose, a clamping ring encircling the hose and the tapered portion of the nipple that is positioned therein, and tie wires threaded through the perforations in the ring and having their ends formed into hooks which engage said clamping ring.

In testimony whereof I have signed my name to this specification.

JOHN R. LOWREY.